United States Patent

[11] 3,573,481

| [72] | Inventor | Donald L. Cummins<br>Anderson, Ind. |
| --- | --- | --- |
| [21] | Appl. No. | 860,715 |
| [22] | Filed | Sept. 24, 1969 |
| [45] | Patented | Apr. 6, 1971 |
| [73] | Assignee | General Motors Corporation<br>Detroit, Mich. |

[54] ELECTRIC CRANKING MOTOR AUTOMATIC DISCONNECT AND LOCKOUT CIRCUIT
2 Claims, 1 Drawing Fig.

[52] U.S. Cl. .................................................... 290/28, 290/37
[51] Int. Cl. ....................................................... F02n 11/00
[50] Field of Search ............................................. 290/37, 38; 123/179 (Big)

[56] References Cited
UNITED STATES PATENTS

| 3,264,483 | 8/1966 | Alexander | 290/38 |
| --- | --- | --- | --- |
| 3,415,999 | 12/1968 | Noury | 290/37 |
| 3,443,112 | 5/1969 | Huntzinger | 290/38 |
| 3,476,950 | 11/1969 | Carlson | 290/38 |

*Primary Examiner*—G. R. Simmons
*Attorneys*—Eugene W. Christen, Creighton R. Meland and Richard G. Stahr

ABSTRACT: An electric cranking motor automatic disconnect and lockout circuit. The normally open contacts of a cranking motor solenoid-operated switch, having the operating coil thereof connected across a source of direct current potential through the anode-cathode electrodes of a first silicon-controlled rectifier, are connected in series with the electric cranking motor across a source of direct current potential. Upon the closure of an electric switch, the source of direct current potential is applied across the emitter-base electrodes and the emitter-collector electrodes of a type PNP transistor. The conducting transistor produces a trigger signal which is applied across the gate-cathode electrodes of the first silicon-controlled rectifier to render this device conductive to establish an energizing circuit for the operating coil of the solenoid operated switch and a charging circuit for a capacitor. At least a portion of the output potential of an electric generator driven by the cranked engine is applied across the gate-cathode electrodes of a second silicon-controlled rectifier, the anode-cathode electrodes of which are connected in series with the capacitor across the anode-cathode electrodes of the first silicon-controlled rectifier and across the base-emitter electrodes of the transistor. When the generator output potential is of sufficient magnitude to produce gate-cathode current through the second silicon-controlled rectifier, the resulting anode-cathode current flow therethrough establishes a discharge circuit for the capacitor in an inverse polarity relationship across the anode-cathode electrodes of the first silicon-controlled rectifier to extinguish this device, thereby interrupting the energizing circuit for the operating coil of the solenoid-operated switch, and effectively connects the emitter-base electrodes of the transistor together to extinguish this device to remove the trigger signals from the first silicon-controlled rectifier thereby preventing the retriggering of the first silicon-controlled rectifier after the capacitor has discharged.

Patented April 6, 1971
3,573,481
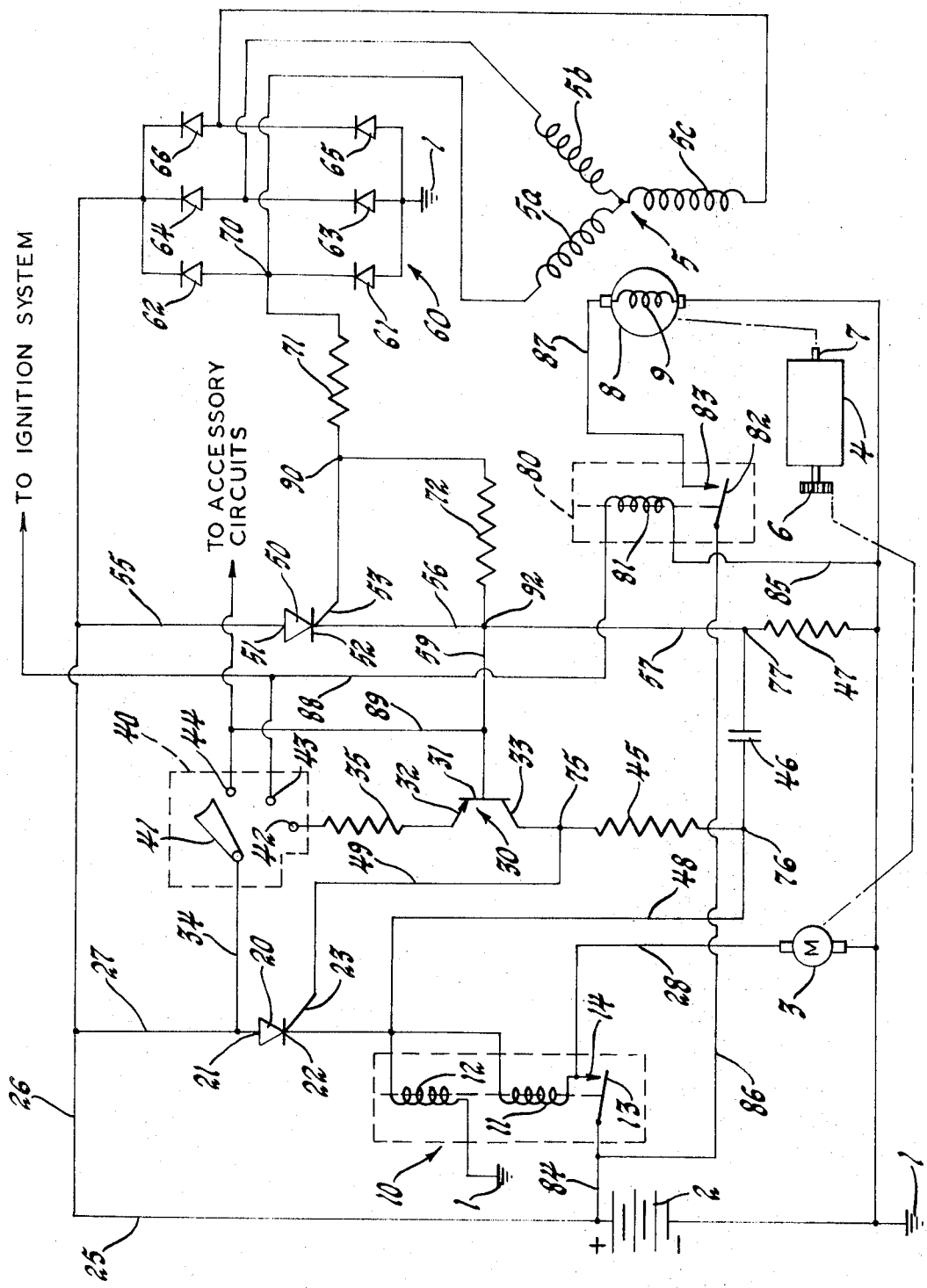
INVENTOR.
Donald L. Cummins
BY
Richard G. Stahr
ATTORNEY

ELECTRIC CRANKING MOTOR AUTOMATIC DISCONNECT AND LOCKOUT CIRCUIT

This invention is directed to an electric cranking motor automatic disconnect and lockout circuit and, more specifically, to a circuit of this type which is responsive to the output potential magnitude of an electric generator driven by the cranked engine to automatically interrupt the cranking motor energizing circuit upon engine "start" and to prevent the reenergization thereof while the engine is in the running mode.

Electric cranking motors are frequently employed to start internal combustion engines which are used as a power source for a variety of applications. To prevent serious damage to the engine, the cranking motor and the cranking motor engagement mechanism, it is mandatory that the cranking motor be deenergized upon engine "start." It is equally important that the cranking motor be not energized while the engine is in the running mode.

Therefore, a circuit which will automatically deenergize the cranking motor upon engine "start" and which will prevent the reenergization of the cranking motor while the engine is in the running mode is desirable.

It is, therefore, an object of this invention to provide an improved electric cranking motor automatic disconnect and lockout circuit.

It is another object of this invention to provide an improved electric cranking motor automatic disconnect and lockout circuit which is responsive to the output potential magnitude of an electric generator driven by the cranked engine to interrupt the cranking motor energizing circuit upon engine "start" and to prevent the reestablishment thereof while the engine is in the running mode.

In accordance with this invention, an electric cranking motor automatic disconnect and lockout circuit is provided wherein the energizing circuit for the operating coil of the cranking motor solenoid-operated switch is interrupted by a first silicon-controlled rectifier, the anode-cathode electrodes of which are connected in series therewith, when the first silicon-controlled rectifier is extinguished in response to the output potential of an electric generator driven by the cranked engine reaching a sufficient magnitude to produce anode-cathode conduction through a second silicon-controlled rectifier which connects a charged capacitor across the anode-cathode electrodes of the first silicon-controlled rectifier in a reverse polarity relationship.

For a better understanding of the present invention, together with additional objects, advantages and features thereof, reference is made to the following description and accompanying single FIG. drawing which sets forth the electric cranking motor automatic disconnect and lockout circuit of this invention in schematic form. As the point of reference or ground potential is the same point electrically throughout the system, it has been illustrated by the accepted symbol and referenced by the numeral 1 in the FIGURE.

Referring to the FIG., the electric cranking motor automatic disconnect and lockout circuit of this invention is set forth in schematic form in combination with a source of direct current potential, which may be a conventional storage battery 2, an electric cranking motor 3 connected thereacross through the normally open contacts of a cranking motor solenoid-operated switch 10 having at least one operating coil 11 and two normally open contacts, movable contact 13 and stationary contact 14, an internal combustion engine 4 to be cranked thereby and an electric generator 5 driven by the cranked engine 4.

As conventional electric cranking motors, internal combustion engines and electric generators adapted to be driven by internal combustion engines are well known in the art and, per se, form no part of this invention, in the interest of reducing drawing complexity, each has been symbolically represented in the FIGURE. Cranking motor 3 may be drivably engaged with gear 6 of engine 4 through any method well known in the automotive art and generator 5 may be driven by a belt-connecting pulley 7 of engine 4 and armature 8 of generator 5 in a manner well known in the automotive art.

The cranking motor solenoid-operated switch 10, hereinafter referred to as a solenoid-operated switch, is shown in the FIGURE to have two coils 11 and 12. This is a common expedient, particularly in the automotive art, for the purpose of conserving battery power. Coil 11 is the operating or "pull-in" coil which, when energized, closes movable contact 13 to stationary contact 14 and coil 12 is a "hold-in" coil which maintains movable contact 13 in electrical contact with stationary contact 14 after "pull-in" coil 11 is shorted out by the closed contacts. It is to be specifically understood that a solenoid-operated switch having only one coil may be used without departing from the spirit of the invention.

The electric generator 5 driven by engine 4 is shown in the FIGURE to be a three-phase alternator having three output windings 5a, 5b and 5c. When field coil 9, rotated with armature 8, is energized by a direct current, a three-phase potential is induced in output coils 5a, 5b and 5c. Although the electric generator 5 driven by the cranked engine 4 is shown in the FIGURE to be a three-phase alternator, it is to be specifically understood that the cranking motor automatic disconnect and lockout circuit of this invention is equally satisfactory for use with a direct current generator driven by the cranked engine 4.

Operating coil 11 of solenoid-operated switch 10 is connected across the source of direct current potential 2 through the anode-cathode electrodes of a first silicon-controlled rectifier 20, having an anode 21, a cathode 22 and a gate 23 electrodes, through an energizing circuit which may be traced from the positive polarity terminal of battery 2, through leads 25, 26 and 27, anode electrode 21 and cathode electrode 22 of silicon-controlled rectifier 20, operating coil 11, lead 28, the armature of cranking motor 3 and point of reference or ground potential 1 to the negative polarity terminal of battery 2. "Hold-in" coil 12 of solenoid-operated switch 10 is also connected across battery 2 through silicon-controlled rectifier 20.

The current-carrying electrodes, emitter electrode 32 and collector electrode 33, of a type PNP transistor 30 are connected across the source of direct current potential 2 through the movable contact 41 and one of the stationary contacts 42 of an electric switch 40, having a movable contact and at least two stationary contacts, through a circuit which may be traced from the positive polarity terminal of battery 2, through leads 25, 26 and 27, lead 34, movable contact 41 and stationary contact 42 of electric switch 40, current limiting resistor 35, the emitter-collector electrodes of transistor 30, resistor 45, lead 48, the parallel combination of "hold-in" coil 12 of solenoid-operated switch 10 and series connected operating coil 11 of solenoid-operated switch 10 and the armature of cranking motor 3 and point of reference or ground potential 1 to the negative polarity terminal of battery 2.

The electric switch 40 may be a conventional automotive-type ignition switch having an open or "off" position, in which it is shown in the FIGURE, a "run" position at which movable contact 41 is closed to stationary contacts 43 and 44 and a "-crank" position at which movable contact 41 is closed to stationary contacts 42 and 43. As is well known in the art, switches of this type are spring biased to automatically return to the "run" position wherein movable contact 41 is closed to stationary contacts 43 and 44 when the torque applied to the ignition key is released.

When switch 40 is operated to the "crank" position, it is necessary that a trigger signal be applied across the gate-cathode electrodes of silicon-controlled rectifier 20 to render this device conductive through the anode-cathode electrodes thereof to complete an energizing circuit for operating coil 11 and "hold-in" coil 12 of solenoid-operated switch 10. To provide this trigger signal, the gate electrode 23 of silicon-controlled rectifier 20 may be connected to a selected one of the current-carrying electrodes of transistor 30. In the FIGURE, gate 23 of silicon-controlled rectifier 20 is connected to the collector electrode 33 of transistor 30 through lead 49.

Upon engine "start," circuitry including capacitor 46 and silicon-controlled rectifier 50, having an anode 51, a cathode 52 and a gate 53 electrodes, is provided for extinguishing silicon-controlled rectifier 20 to interrupt the energizing circuit, previously described, for operating coil 11 of solenoid-operated switch 10 and for extinguishing transistor 30 to interrupt the production of trigger signals for silicon-controlled rectifier 20. Capacitor 46 and the anode-cathode electrodes of silicon-controlled rectifier 50 are connected in series across the anode-cathode electrodes of silicon-controlled rectifier 20 through a first circuit which may be traced from capacitor 46 through lead 48, the cathode-anode electrodes of silicon-controlled rectifier 20, lead 27, lead 26, lead 55, the anode-cathode electrodes of silicon-controlled rectifier 50 and leads 56 and 57 to the other plate of capacitor 46 and the anode-cathode electrodes of silicon-controlled rectifier 50 are connected across the base electrode and a selected one of the current-carrying electrodes of transistor 30, base electrode 31 and emitter electrode 32, through a second circuit which may be traced from the emitter electrode 32 of transistor 30 through resistor 35, stationary contact 42 and movable contact 41 of switch 40, lead 34, lead 27, lead 26, lead 55, the anode-cathode electrodes of silicon-controlled rectifier 50 and leads 56 and 59 to the base electrode 31 of transistor 30.

For proper operation of the circuit of this invention, it is necessary that at least a portion of the output potential of the generator driven by the cranked engine be applied across the gate-cathode electrodes of silicon-controlled rectifier 50 in a polarity relationship to produce gate-cathode and, consequently, anode-cathode current flow therethrough.

As the generator 5 driven by cranked engine 4 is shown in the FIGURE to be a three-phase alternator, a three-phase diode bridge-type rectifier circuit 60 comprising the parallel combination of three pairs of series connected diodes 61—62, 63—64 and 65—66 is provided for rectifying the output potential thereof.

While generator 5 is producing an output potential, a half-wave rectified alternating current output potential appears across the junction between each series connected pair of diodes of rectifier circuit 60 and point of reference or ground potential 1 and is of a positive polarity at the junction between the diodes with respect to point of reference or ground potential 1.

To apply at least a portion of the output potential of generator 5 across the gate-cathode electrodes of silicon-controlled rectifier 50 in a polarity relationship to produce gate-cathode current flow therethrough, the gate electrode may be connected to the junction between any series connected pair of diodes of rectifier circuit 60 and the cathode electrode may be connected to point of reference or ground potential 1.

In the FIGURE, gate electrode 53 of silicon-controlled rectifier 50 is connected to junction 70 between series connected pair of diodes 61 and 62 through resistor 71 and the cathode electrode 52 thereof is connected to point of reference or ground potential 1 through leads 56 and 57 and resistor 47. Gate electrode 53 of silicon-controlled rectifier 50 may also be connected to either the junction between diodes 63 and 64 or the junction between diodes 65 and 66. With some applications, it may be desirable to apply only a portion of the potential appearing across the junction between any series connected pair of diodes of rectifier circuit 60 and point of reference or ground potential 1 across the gate-cathode electrodes of silicon-controlled rectifier 50. In this event, a resistor 72 may be connected across the gate-cathode electrodes of silicon-controlled rectifier 50. With resistor 72 in the circuit, only that portion of the output potential of generator 5 which is dropped across resistor 72 is applied across the gate-cathode electrodes of silicon-controlled rectifier 50.

Relay 80, having an operating coil 81, a movable contact 82 and a stationary contact 83, is a conventional generator field relay which establishes an energizing circuit for field coil 9 of generator 5 across source of direct current potential 2 while electric switch 40 is in the "crank" or "run" position. Although relay 80 is not a part of the circuit of this invention, one example of the electrical connection of this relay into the overall circuit has been illustrated in the FIGURE in the interest of a complete specification.

Upon the operation of movable contact 41 of electric switch 40 to the "crank" position at which it is in electrical contact with stationary contacts 42 and 43, battery potential is applied across the emitter-collector electrodes of transistor 30, through a circuit previously described, in the correct polarity relationship for emitter-collector conduction through a type PNP transistor; a circuit is established for emitter-base current flow through a type PNP transistor which may be traced from the positive polarity terminal of battery 2, through leads 25, 26, 27, and 34, movable contact 41 and stationary contact 42 of switch 40, resistor 35, the emitter-base electrodes of transistor 30, leads 59 and 57, resistor 47 and point of reference or ground potential 1 to the negative polarity terminal of battery 2 and an energizing circuit is established for operating coil 81 of field relay 80 through a circuit which may be traced from the positive polarity terminal of battery 2, through leads 25, 26, 27 and 34, movable contact 41 and stationary contact 43 of electric switch 40, lead 88, operating coil 81, lead 85 and point of reference or ground potential 1 to the negative polarity terminal of battery 2.

Energized operating coil 81 of field relay 80 closes movable contact 82 thereof into electrical contact with stationary contact 83 to complete an energizing circuit for field coil 9 of generator 5 through a circuit which may be traced from the positive polarity terminal of battery 2, through leads 84 and 86, movable contact 82 and stationary contact 83 of field relay 80, lead 87, field coil 9 of generator 5 and point of reference or ground potential 1 to the negative polarity terminal of battery 2.

Upon the completion of the circuit for emitter-base current flow through type PNP transistor 30, the resulting emitter-base current produces emitter-collector current through transistor 30 to complete a circuit which may be traced from the positive polarity terminal of battery 2, through leads 25, 26, 27 and 34, movable contact 41 and stationary contact 42 of electric switch 40, resistor 35, the emitter-collector electrodes of transistor 30, resistor 45, lead 48, the parallel combination of "hold-in" coil 12 of solenoid-operated switch 10 and series connected operating coil 11 of solenoid-operated switch 10, lead 28 and armature of cranking motor 3 and point of reference or ground potential 1 to the negative polarity terminal of battery 2. The current flow through this circuit produces a potential drop across resistor 45 which is of a positive polarity at junction 75 with respect to junction 76. This potential drop across resistor 45 is the trigger signal for silicon-controlled rectifier 20 and is applied across the gate-cathode electrodes thereof in the proper polarity relationship to produce gate current therethrough through respective leads 49 and 48. The gate current through silicon-controlled rectifier 20, which is produced by the trigger signal appearing across resistor 45, produces anode-cathode current flow through this device to complete an energizing circuit, previously described, for operating coil 11 and "hold-in" coil 12 of solenoid-operated switch 10 and a charging circuit for capacitor 46 which may be traced from the positive polarity terminal of battery 2, through leads 25, 26 and 27, the anode-cathode electrodes of silicon-controlled rectifier 20, lead 48, capacitor 46, resistor 47 and point of reference or ground potential 1 to the negative polarity terminal of battery 2.

Upon the completion of this charging circuit, capacitor 46 receives a charge which is of a positive polarity upon the plate connected to junction 76 with respect to the plate connected to junction 77.

Energized operating coil 11 of solenoid-operated switch 10 closes movable contact 13 thereof into electrical contact with stationary contact 14 to complete an energizing circuit for cranking motor 3 which may be traced from the positive polarity terminal of battery 2 through lead 84, movable contact 13 and stationary contact 14, now closed, of solenoid-operated switch 10, lead 28, cranking motor 3 and point of reference or ground potential 1 to the negative polarity terminal of battery 2.

When the engine 4 starts, the energized field coil 9 of generator 5 induces a three-phase potential in output coils 5a, 5b and 5c thereof. The potential appearing across coils 5a and 5b or 5c is half-wave rectified and appears as a pulsating direct current potential across junction 70 and point of reference or ground potential 1 and is of a positive polarity upon junction 70 with respect to point of reference or ground potential 1 while the terminal end of output coil 5a is of a positive polarity. This pulsating direct current potential produces a current flow through series resistors 71 and 72, lead 57 and resistor 47 to point of reference or ground potential 1. That portion of the output potential of generator 5 which is dropped across resistor 72 as a result of this current flow is of a positive polarity at junction 90 with respect to junction 92 and is applied across the gate-cathode electrodes of silicon-controlled rectifier 50 in the proper polarity relationship to produce gate-cathode electrode current flow therethrough. As the anode electrode of silicon-controlled rectifier 50 is connected to the positive polarity terminal of battery 2 through leads 25 and 26 and the cathode electrode thereof is connected to the negative polarity terminals of battery 2 through leads 56 and 57, resistor 47 and point of reference or ground potential 1, the gate-cathode current flow produced by the potential appearing across resistor 72 initiates anode-cathode current flow through silicon-controlled rectifier 50.

When silicon-controlled rectifier 50 is triggered conductive by the potential drop appearing across resistor 72, a circuit is established for applying capacitor 46 across the anode-cathode electrodes of silicon-controlled rectifier 20 in a reverse polarity relationship. That is, the cathode electrode of silicon-controlled rectifier 20 is connected to the positive polarity plate of capacitor 46 through lead 48 and the anode electrode 21 of silicon-controlled rectifier 20 is connected to the negative polarity plate of capacitor 46 through leads 27, 26 and 55, the anode-cathode electrodes of silicon-controlled rectifier 50 and leads 56 and 57. The charge upon capacitor 46, being connected across the anode-cathode electrodes of silicon-controlled rectifier 20 in an inverse polarity relationship, extinguishes this device to interrupt the energizing circuit for "hold-in" coil 12 of solenoid-operated switch 10. With "hold-in" coil 12 deenergized, movable contact 13 moves out of electrical contact with stationary contact 14 to interrupt the energizing circuit for cranking motor 3.

Conducting silicon-controlled rectifier 50 also places substantially full positive polarity battery potential upon the base electrode 31 of transistor 30 thereby placing the emitter-base electrodes of this device at substantially the same potential, a condition which extinguishes transistor 30 to interrupt the trigger signal for silicon-controlled rectifier 20. Consequently, silicon-controlled rectifier 20 will not become conductive through the anode-cathode electrodes thereof after capacitor 46 has discharged.

At this time, movable contact 41 of electric switch 40 may be returned to the "run" position at which it is in electrical contact with stationary contacts 43 and 44. In this position, the emitter-collector circuit for transistor 30 is interrupted and substantially full positive polarity battery potential is placed upon the base electrode thereof through lead 89. Consequently, transistor 30 remains nonconductive. With transistor 30 not conducting, there is no trigger signal produced for silicon-controlled rectifier 20, consequently, this device remains in the nonconducting condition to maintain the energizing circuit for operating coil 11 of solenoid operated switch 10 interrupted. In this position of electric switch 40, substantially full positive battery potential is also placed upon the cathode electrode of silicon-controlled rectifier 50 through lead 89. With positive polarity battery potential present upon the cathode electrode of silicon-controlled rectifier 50, this device extinguishes.

Should the movable contact 41 of electric switch 40 be inadvertently returned to the "crank" position, bridging stationary contacts 42 and 43, after engine 4 has started and remains in the running mode, battery potential will be removed from the cathode electrode of silicon-controlled rectifier 50 to permit this device to conduct through the anode-cathode electrodes thereof to place battery potential upon the base electrode 31 of transistor 30 through leads 56 and 59. As a consequence, no emitter-base current flows through transistor 30, consequently, there is no trigger signal produced for silicon-controlled rectifier 20. In the absence of a trigger signal, silicon-controlled rectifier 20 remains nonconductive to maintain the energizing circuit for operating coil 11 of solenoid-operated switch 10 interrupted, consequently, cranking motor 3 is not energized with the engine 4 running.

While specific electrical devices and polarities have been set forth in the specification, it is to be specifically understood that alternate electrical devices having similar electrical characteristics with compatible electrical polarities may be substituted therefor without departing from the spirit of the invention.

I claim:

1. An electric cranking motor automatic disconnect and lockout circuit comprising in combination with a source of direct current potential, a cranking motor connected thereacross through the normally open contacts of a solenoid-operated switch having at least one operating coil, an engine to be cranked thereby and an electrical generator driven by the engine;

an electric switch;

a first silicon-controlled rectifier having an anode, a cathode and a gate electrode;

means for connecting said operating coil of said solenoid-operated switch across said source of direct current potential through said anode-cathode electrodes of said silicon-controlled rectifier;

a transistor having a base and two current-carrying electrodes;

means including said electric switch for connecting said current-carrying electrodes of said transistor across said direct current potential source;

means for connecting said gate electrode of said silicon-controlled rectifier to a selected one of said current carrying electrodes of said transistor;

a capacitor;

means for connecting said capacitor across said source of direct current potential through said anode-cathode electrodes of said first silicon-controlled rectifier;

a second silicon-controlled rectifier having an anode, a cathode and a gate electrode;

first circuit means for connecting said anode-cathode electrodes of said second silicon-controlled rectifier and said capacitor in series across said anode-cathode electrodes of said first silicon-controlled rectifier, second circuit means for connecting said anode-cathode electrodes of said second silicon-controlled rectifier across said base electrode and a selected one of said current-carrying electrodes of said transistor; and means for applying at least a portion of the output potential of said electrical generator across said gate-cathode electrodes of said second silicon-controlled rectifier in a polarity relationship to produce gate-cathode current flow therethrough.

2. An electric cranking motor automatic disconnect and lockout circuit comprising in combination with a source of direct current potential, a cranking motor connected thereacross through the normally open contacts of a solenoid-operated switch having at least one operating coil, an engine to be cranked thereby and a three-phase alternator driven by the engine;

an electric switch;

a first silicon-controlled rectifier having an anode, a cathode and a gate electrode;

means for connecting said operating coil of said solenoid-operated switch across said source of direct current potential through said anode-cathode electrodes of said silicon-controlled rectifier;

a transistor having a base and two current-carrying electrodes;

means including said electric switch for connecting said current-carrying electrodes of said transistor across said direct current potential source;

means for connecting said gate electrode of said silicon-controlled rectifier to a selected one of said current-carrying electrodes of said transistor;

a capacitor;

means for connecting said capacitor across said source of direct current potential through said anode-cathode electrodes of said first silicon-controlled rectifier;

a second silicon-controlled rectifier having an anode, a cathode and a gate electrode;

first circuit means for connecting said anode-cathode electrodes of said second silicon-controlled rectifier and said capacitor in series across said anode-cathode electrodes of said first silicon-controlled rectifier;

second circuit means for connecting said anode-cathode electrodes of said second silicon-controlled rectifier across said base electrode and a selected one of said current carrying electrodes of said transistor;

a three-phase diode bridge-type rectifier circuit comprising the parallel combination of three pairs of series connected diodes for rectifying the output of said three-phase alternator; and means for connecting said gate electrode of said second silicon-controlled rectifier to a junction between any two of said series connected diodes of said rectifier circuit.